(12) United States Patent
Ried et al.

(10) Patent No.: US 9,433,222 B2
(45) Date of Patent: Sep. 6, 2016

(54) DEVICE AND METHOD FOR DISTRIBUTING RESIDUAL AIR IN PASTY MASSES, IN PARTICULAR FOR THE PRODUCTION OF SAUSAGES

(71) Applicant: ALBERT HANDTMANN MASCHINENFABRIK GMBH & CO. KG, Biberach (DE)

(72) Inventors: Martin Ried, Ehingen-Sontheim (DE); Uwe Weckenmann, Uttenweiler (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 0 days.

(21) Appl. No.: 15/048,473

(22) Filed: Feb. 19, 2016

(65) Prior Publication Data

US 2016/0165905 A1 Jun. 16, 2016

Related U.S. Application Data

(63) Continuation of application No. 13/334,192, filed on Dec. 22, 2011, now abandoned.

(30) Foreign Application Priority Data

Dec. 22, 2010 (EP) .................................. 10196558

(51) Int. Cl.
*A22C 11/00* (2006.01)
*A22C 11/02* (2006.01)
(Continued)

(52) U.S. Cl.
CPC .......... *A22C 11/0209* (2013.01); *A22C 11/0245* (2013.01); *A22C 11/06* (2013.01); *F26B 1/00* (2013.01); *F26B 1/005* (2013.01); *F26B 3/082* (2013.01); *F26B 3/092* (2013.01)

(58) Field of Classification Search
CPC .......... A22C 11/0209; A22C 11/0245; A22C 11/06; F26B 3/082; F26B 3/092; F26B 1/00; F26B 1/005
USPC ................................................... 366/257
See application file for complete search history.

(56) References Cited

U.S. PATENT DOCUMENTS 2,568,491 A * 9/1951 Edwards ................. A22C 11/02
425/133.1
2,817,500 A * 12/1957 Robinson .............. B01F 5/0665
137/503

(Continued)

FOREIGN PATENT DOCUMENTS

CH 543236 A 10/1973
DE 354448 C 6/1922

(Continued)

OTHER PUBLICATIONS

European search report for 10196558.0 dated Jun. 29, 2011, 8 pages.

*Primary Examiner* — Tony G Soohoo
(74) *Attorney, Agent, or Firm* — Marshall, Gerstein & Borun LLP (57) ABSTRACT

A device and a method for distributing residual air in a pasty mass, in particular for the production of sausages, with a housing comprising a flow channel and an inlet and outlet for the pasty mass, and with a distributor means for deflecting and mixing the pasty mass thoroughly in the flow channel, where the distributor means can be adjusted such that the mixing of the pasty mass can be adjusted.

5 Claims, 8 Drawing Sheets

(51) Int. Cl.
  *A22C 11/06* (2006.01)
  *F26B 1/00* (2006.01)
  *F26B 3/08* (2006.01)
  *F26B 3/092* (2006.01)

(56) References Cited

U.S. PATENT DOCUMENTS

| | | | | |
|---|---|---|---|---|
| 2,999,270 A * | 9/1961 | Knapp | A22C 11/0245 | 452/31 |
| 3,091,799 A * | 6/1963 | Cieri | A22C 11/0209 | 452/45 |
| 3,599,556 A * | 8/1971 | Madsen | B65B 25/001 | 99/472 |
| 3,601,845 A * | 8/1971 | Mavrich | A22C 11/06 | 222/309 |
| 3,647,344 A | 3/1972 | Skibo et al. | | |
| 3,776,529 A * | 12/1973 | Sutter | B01F 11/0057 | 366/78 |
| 4,512,059 A * | 4/1985 | Beckman | A22C 11/0254 | 452/38 |
| 4,570,301 A * | 2/1986 | Beckman | A22C 11/02 | 452/35 |
| 4,921,842 A * | 5/1990 | Henning | B01F 5/045 | 524/802 |
| 4,955,109 A * | 9/1990 | Evans | A22C 11/02 | 452/35 |
| 5,603,354 A | 2/1997 | Jacobsen et al. | | |
| 5,830,050 A * | 11/1998 | Nakamura | A22C 11/0236 | 452/31 |
| 6,056,634 A * | 5/2000 | Schwarz | A23L 1/0079 | 366/337 |
| 6,467,403 B1 * | 10/2002 | Lagares-Corominas | A22C 11/02 | 222/368 |
| 7,034,067 B1 * | 4/2006 | Klinksiek | B01F 5/0077 | 428/402 |
| 7,207,712 B2 * | 4/2007 | Kozyuk | B01F 3/0807 | 138/40 |
| 2008/0175725 A1 * | 7/2008 | Le Paih | A22C 11/04 | 417/221 |
| 2009/0174103 A1 | 7/2009 | Ponta et al. | | |
| 2010/0203816 A1 * | 8/2010 | Maile | A22C 11/06 | 452/30 |
| 2012/0159805 A1 * | 6/2012 | Ried | A22C 11/0209 | 34/386 |

FOREIGN PATENT DOCUMENTS

| | | |
|---|---|---|
| EP | 2198717 A2 | 6/2010 |
| EP | 2218331 A2 | 8/2010 |

* cited by examiner

(Prior Art)

DEVICE AND METHOD FOR DISTRIBUTING RESIDUAL AIR IN PASTY MASSES, IN PARTICULAR FOR THE PRODUCTION OF SAUSAGES

CROSS-REFERENCE TO RELATED APPLICATION

The present application claims the benefit of priority of U.S. application Ser. No. 13/334,192 filed Dec. 22, 2011, which application claims priority to European Application No. 10196558.0, filed Dec. 22, 2010. The entire text of the priority application is incorporated herein by reference in its entirety.

FIELD OF THE DISCLOSURE

The disclosure relates to a device and a method for distributing residual air in pasty masses, in particular for the production of sausages.

BACKGROUND

In the production of sausages, pasty masses are filled into sausage casings by means of filling machines. During the processing of the pasty masses, however, undesired air accumulations occur in the pasty mass.

Therefore, so-called residual air distributors or nozzles have been already used in the outlet, i.e. in an area downstream of the conveyor system or else e.g. in the filling tube.

A dispersion of air bubbles, however, can only be achieved in the area downstream of the conveyor system, i.e. on the pressure side, as corresponding pressure differences are required for this.

However, it is extremely difficult to correctly select air distribution systems which are employed downstream of the conveyor system. A certain distributor inset which deflects and mixes the pasty mass thoroughly to thus homogenize the pasty mass, however, is only suited for a certain field of application. Therefore, various distributor insets are required when the product is changed several times. The distributor insets then must be exchanged in a time-consuming manner, or else a distributor inset must be completely removed if products with relatively large ingredients, e.g. ham sausage, are produced. Therefore, a filling line which, for example, consists of a vacuum filler plus attachments (e.g. metal detectors, clippers, etc.) must be moved apart for inserting or exchanging the distributor insets. However, to change the distributor insets means
 expenditure of much time,
 functional problems (e.g. the casing brake at the clipper must be readjusted),
 misalignments of the individual units as to their angularity and height (undesired distortions and warping at components)
 relatively long interruption of the production operation, and
 physical strain in case of heavy attachments (e.g. moving heavy clip machines).

The known distributor insets act as throttles due to a reduction of the cross-section and initially cause a pressure build-up in the outlet of the conveyor system, i.e. in front of the distributor inset.

Figure 11:
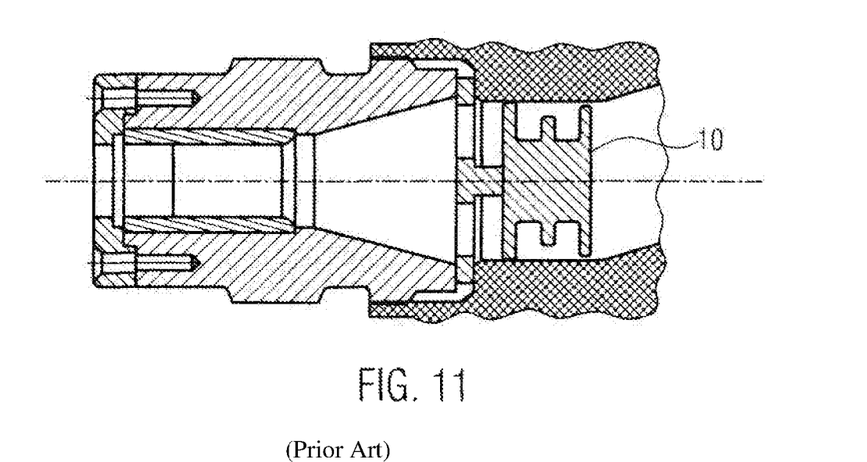
FIG. 11 shows a section through an outlet region of a filling machine with an exchangeable distributor inset according to prior art.

FIG. 11 shows a corresponding distributor inset. This pressure build-up, however, varies depending on the filling rate and further parameters, e.g. the consistency and viscosity of the mass, temperature, air content, etc.

The distributor insets have a fixed sectional area of flow in the installed state, therefore, a conveyor system pressure depending on the filling speed builds up. For the air to be able to uniformly distribute in the product by using the distributor inset, a corresponding conveyor system pressure must be built up.

With too little pressure build-up, the air is only insufficiently uniformly distributed. With an excessive pressure build-up, the product is mechanically heavily stressed with negative effects on product quality.

Consequently, the distributor's cross-section must match the product consistency and filling speed. Here, a compromise is always only possible if a certain type of distributor is employed.

SUMMARY OF THE DISCLOSURE

Starting from this situation, one aspect underlying the present disclosure is to provide a device and a method for distributing residual air in pasty masses which can distribute the air in the pasty mass optimally homogenously, even in case of viscosity differences of the pasty mass and changes in the filling speed, without the device or a part of the device having to be exchanged.

So, in accordance with the disclosure, the device comprises a housing which comprises a flow channel as well as an inlet and an outlet for the pasty mass. The flow channel is defined such that it extends from the inlet to the outlet. A distributor means is provided in the flow channel by which the pasty mass can be deflected and thoroughly mixed. By the deflection and thorough mixing caused by it, the air inclusions are distributed. The pasty mass then has a more homogenous air distribution at the outlet of the housing.

In accordance with the disclosure, the distributor means can now be adjusted such that mixing can be adjusted. Thus, by adjusting the distributor means, mixing can be adapted to different production conditions and different viscosities of the product and/or different filling speeds. A higher degree of mixing also means higher pressure loss in the flow channel and thus a pressure increase in front of the device. A lower degree of mixing means lower pressure loss in the flow channel and thus lower back pressure in front of the device. Thus, by adjusting the distributor means, the admission pressure that is required to uniformly distribute air in the product can be adjusted. Here, the disclosure offers the following advantages:
 optimal filling pressure with corresponding optimal air distribution independent of the filling speed and flowability of the product at varying parameters, such as filling speed and viscosity
 the distributor means no longer has to be exchanged for product-specific adaptations, so that the displacement of heavy attachments and an extended loss of production are eliminated,
 damage to the product by unintentional high pressure build-up can be effectively prevented,
 a corresponding device can be easily integrated in the region of the outlet of a filling machine,
 no multitude of different distributor systems is required anymore, so that manufacturing costs can be saved. The insets can be universally used; handling and cleaning possibilities are improved.

So, according to the present disclosure, the position of the installed distributor means can be changed, whereby in particular the free cross-section of flow in the flow channel can be adjusted at least in sections, and/or the effective length of the section with a reduced cross-section of flow can be adjusted.

If the free cross-section of flow is reduced, the turbulences and thus the mixing increase as the cross-section of flow reduces. If the distributor means has a certain length, a section of a reduced cross-section of flow corresponding to this effective length results in the flow channel. This effective length can now be varied by moving the distributor means. Thus, by changing the free cross-section of flow and/or the effective length of the section of a reduced cross-section of flow, mixing and thus throttling can be adjusted.

It is particularly advantageous for the position of the installed distributor means to be adjusted or controlled depending on the pressure p which prevails in front of the distributor means, seen in the direction of flow, and/or the viscosity and/or consistency of the pasty mass. The system can be self-controlling, or a controlling means can be provided here which, for example, measures the pressure upstream or downstream of the device and then controls the position of the distributor means corresponding to a determined set point or set point range. However, in addition or as an alternative, viscosity can be determined, or a corresponding value can be entered via a corresponding input means, wherein the position of the distributor means is then adjusted correspondingly. The matching positions have been determined in advance by trial.

It is also possible to enter a value for the consistency into the controlling means. A corresponding value then corresponds to a certain product of a corresponding composition and with a certain proportion and size range of pieces. Such values are determined by trial, and then suited positions of the distributor means are stored and adjusted by means of the controlling means. Advantageously, the position of the installed distributor means is selected such that the pressure in front of the device is essentially constant or is within a constant range.

According to a particularly advantageous embodiment, the distributor means comprises a piston, in particular with several baffles arranged on it, which is movably arranged at least in a portion of the flow channel such that the effective length of the piston in the flow channel can be adjusted. Depending on the effective length L1 of the baffles of the piston, the pasty mass then must flow over a varying number of baffles, so that a varying mixing or throttling results depending on the effective length L1. Baffles here mean elevations on the piston which hinder the flow path of the pasty mass.

It is particularly advantageous for the distributor means, in particular the piston, to be movable out of the flow channel. The distributor means then only moves into the flow channel to the required extent to hinder the flow of the pasty mass. Here, it is particularly advantageous that the piston or the distributor means can also be completely retracted, or that it can then even be removed without the device having to be dismounted. This is in particular advantageous with products containing large pieces.

The distributor means according to the disclosure, in particular the piston, in a simple manner permit a continuously variable adjustment of the degree of mixing or the throttling effect.

Advantageously, the distributor means, in particular the piston, is connected with a compressible element, in particular a pressure spring, whereby the distributor means or the piston can be moved against the spring force through the pasty mass. A corresponding arrangement can be very easily realized and moreover permits a self-regulating system wherein the piston or the distributor means, respectively, is moved in front of the apparatus or in front of the piston depending on the pressure. Thus, a simple self-regulating system results.

It is particularly advantageous for the pretension of the compressible element, in particular the spring, to be adjustable. The in particular continuously variable adjustment of the spring pretension serves an optimal adaptation in case of great viscosity variations which can occur due to different products (e.g. liverwurst, ham sausage).

However, it is also possible for the distributor means or the piston to be movable by a drive, for example, an electric servomotor, or via compressed air. Then, the distributor means or the piston can be moved to an exact position by a controlling means.

If the piston tapers at least in sections against the direction of flow of the pasty mass and has a conical design in particular at least in sections, with a correspondingly complementary shape of the housing, the piston can also function as a shut-off valve in its home position. The conical design moreover involves shorter control paths.

As an alternative to the embodiment of the distributor means as a piston, the distributor means can also comprise means of the following group: a gate valve for reducing the cross-section, an iris diaphragm, a rotary piston stop valve or a ball valve. Depending on their position, the free cross-section of flow in the flow channel can be changed by these means by them moving at an angle to the direction of flow of the pasty mass, in particular perpendicularly to the direction of flow of the pasty mass.

So, according to the present disclosure, the inlet of the device can be connected with the outlet of a conveyor system of a filling machine, and the outlet of the device can be connected with an attachment, for example a metal detector or a clipper, or else a filling tube. Thus, the device for distributing residual air in pasty masses can be employed at the outlet of a conveyor system of a filling machine. As an alternative, the device can be simply integrated by manufacturers of filling machines, independent of the manufacturers of the attachments.

BRIEF DESCRIPTION OF THE DRAWINGS

The present disclosure will be illustrated below in greater detail with reference to the following figures.

DETAILED DESCRIPTION OF THE PREFERRED EMBODIMENT

Figure 1:
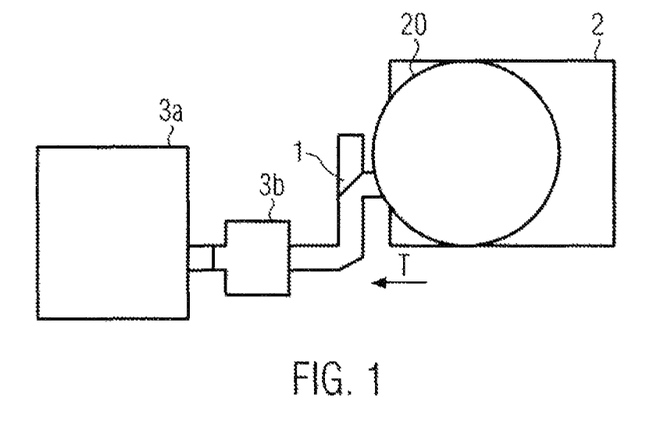
FIG. 1 roughly schematically shows the construction according to the present disclosure.

FIG. 1 shows the principal construction of a filling line with a device 1 for distributing residual air in a pasty mass according to the present disclosure. Here, the filling line comprises a filling machine 2, in particular a vacuum filler, which comprises, as is schematically shown, a feed hopper 20 via which product is fed to a not represented conveyor system, for example in the form of a vane pump. Via the conveyor system, the pasty mass is fed to the device 1 downstream of the conveyor system seen in the direction of transport T, for distributing residual air. In the device 1, the pasty mass is deflected and thoroughly mixed thereby. In the process, the residual air in the pasty mass can distribute uniformly. The pasty mass is then further fed in the direction of transport T to an attachment 3. Such an attachment can comprise, for example, a metal detector 3b and an automatic clipper 3a, or it can also be embodied, for example, in the form of a filling tube. The device 1 is here designed such that the degree of mixing, i.e. the degree of deflection or throttling, can be adapted to different process parameters. Thus, independent of the conveyor speed, the viscosity or the consistency of the pasty mass, a suited conveyor system pressure range can always build up in the device in front of the device 1 which is required for the pasty mass to be sufficiently homogenized, and moreover in order not to damage the pasty mass. Advantageously, this pressure is within a range of 1 to 25 bar. To correspondingly adapt the pressure loss in the device 1, i.e. the mixing, the position of the distributor means 1 can be adjusted without the distributor means or parts thereof having to be dismounted. By adjusting the distributor means, the free cross-section of flow in the flow channel can be adjusted at least in sections, and/or the effective length of the section can be adjusted with a reduced cross-section of flow.

Figure 2:
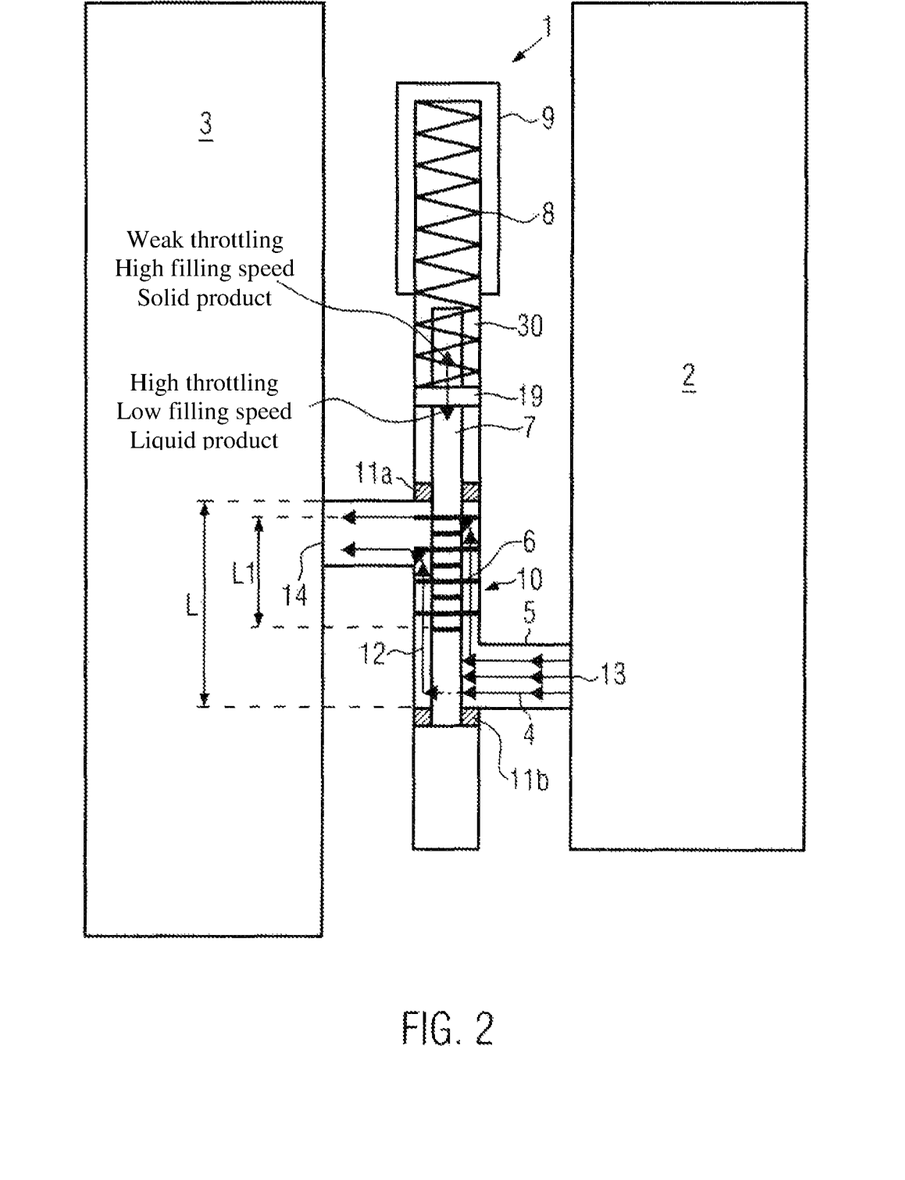
FIG. 2 shows a cross-section through an embodiment according to the present disclosure where the distributor means is arranged in the flow channel.

As in FIG. 1, here, too, the device 1 for distributing residual air is arranged between the filling machine 2 and the attachment 3. The device 1 is here arranged at the conveyor system outlet of the filling machine 2, advantageously screwed to it. The device 1 here comprises a housing 5 with an inlet 13 and an outlet 14 in which a flow channel 12 for the pasty mass 4 is arranged. On the outlet side 14 of the housing 5, there is the same thread as at the conveyor system outlet of the filling machine 2, so that an attachment 3 can be easily connected, instead of to the conveyor system outlet, to the outlet of the device 1. At its inlet side 13, the housing 5 also comprises a thread by means of which it can be connected to the filling machine 2. Thus, the pasty mass can be conveyed from the filling machine 2 into the housing 5 of the device 1. A corresponding arrangement is advantageous for all embodiments.

The distributor means 10 is arranged in the flow channel 12 such that it can reciprocate, as is represented by the arrow. The flow channel 12 is defined such that it extends from the inlet 13 to the outlet 14, as is represented by the arrows. In this embodiment, the distributor means comprises a piston 7 comprising several baffles 6 arranged on it. The pasty mass must flow in the flow channel 12 over or through the baffles 6 of the piston 7, leading to a mixing of the pasty mass and a throttling of the mass flow. The reduction of the cross-section caused by the distributor means 1 causes a pressure increase in front of the piston 7.

Figure 5:
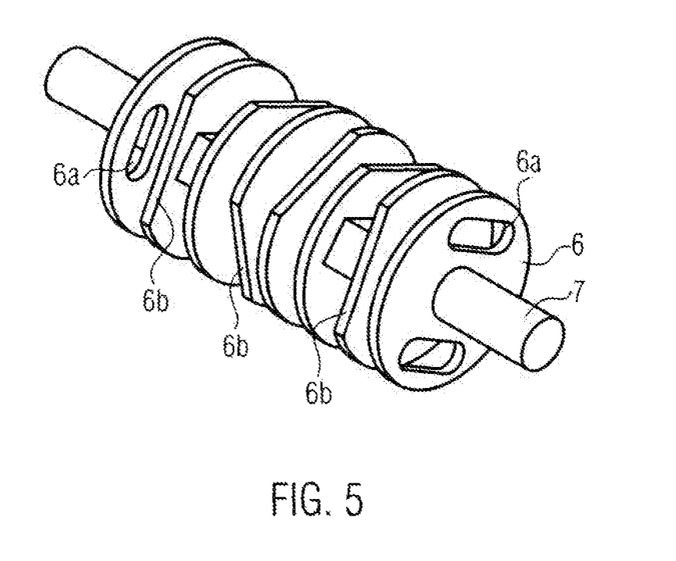
FIG. 5 shows a perspective representation of a possible embodiment of a piston with several baffles.

FIG. 5 shows a perspective representation of a possible embodiment of a corresponding piston 7 with several baffles 6. The baffles 6 are here embodied on the e.g. cylindrical piston 7 such that they project over the piston's surface, seen in the radial direction. Different baffles projecting from the piston can comprise different shapes and dimensions. It is also possible that some baffles 6 arranged annularly around the piston 7 comprise openings 6a through which the pasty mass can be directed in the direction of transport. It is also possible that some baffles have a diameter together with the piston which essentially corresponds to the inner diameter of the housing 5, such that the baffle 6 essentially terminates with the inner wall of the housing 5 while it is still movable within it, one portion 6b of the baffle annularly arranged around the piston 7 being cut-out such that the pasty product is forced to flow over the baffle in this area.

Thus, the distributor means 1, i.e. here the piston with the baffles, causes a section in which the cross-section of flow is reduced. In the embodiment shown in FIG. 2, the complete section with a reduced cross-section of flow has the length L (the piston 7 also already causes a reduction of the cross-section). The effective length of the section of the piston with baffles 6 is referred to as L1. Effective length is defined as the length of the corresponding section which is arranged in the flow channel.

Figure 3:
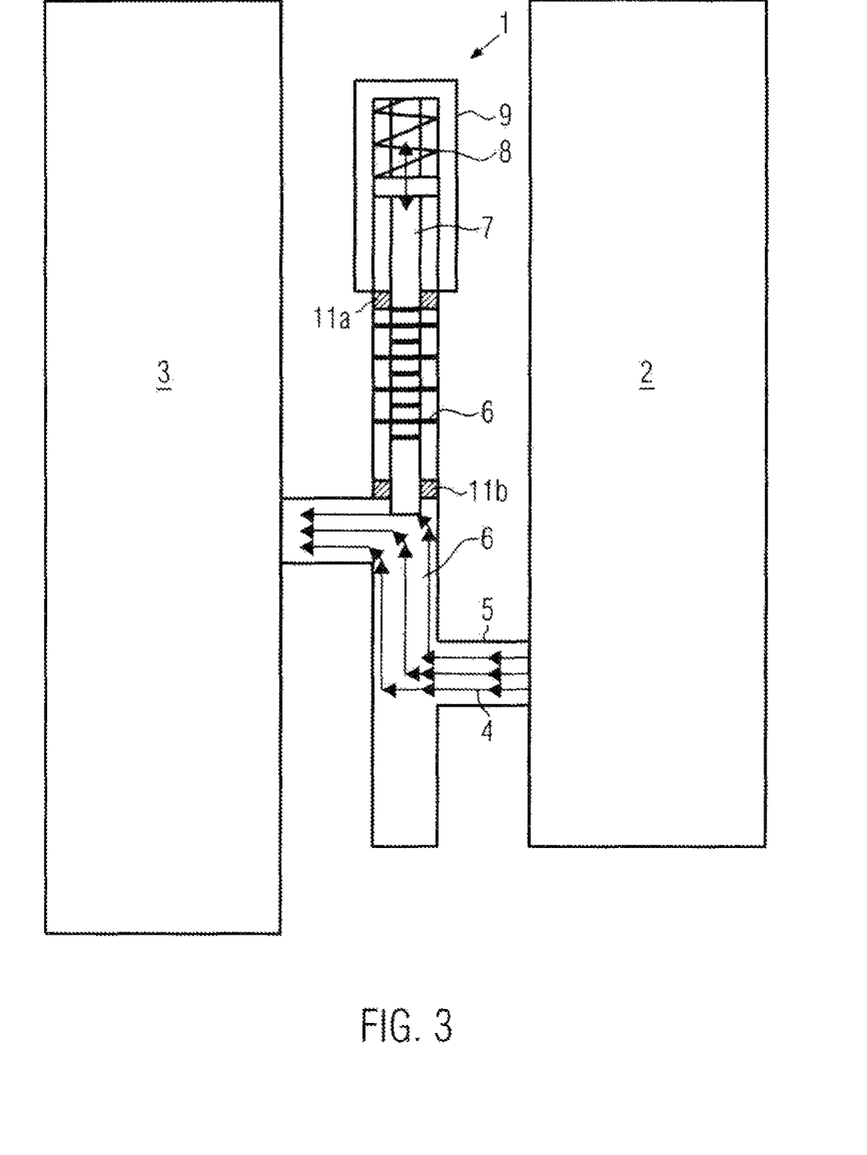
FIG. 3 shows the embodiment shown in FIG. 2, wherein the distributor means is moved out of the flow channel.

At the piston 7, there are an upper sealing section 11a and a lower sealing section 11b which are designed as slide seals, in particular sealing rings. The slide seal 11a prevents pasty mass from flowing into an area 30 of the housing where e.g. the pressure spring 8 is arranged and thus limits the flow channel 12. The seal 11b prevents the pasty mass from flowing in the direction of the distributor means or baffles, respectively, when the distributor means is moved out of the flow channel. The piston furthermore comprises a guide 19 by which the piston can be reciprocated in the e.g. tubular housing 5 corresponding to the arrow direction, i.e. opposite to and with the direction of flow. The inlet 13 and the outlet 14 are located here in a region laterally of the trajectory of the piston 7. At the rear end of the piston 7, here in a region behind the annular projection 19, there is a pressure spring 8. Via the pressure spring 8, the piston 7 is loaded in a defined manner. The spring force of the spring 8 can be adjusted depending on certain process parameters, in particular the viscosity or consistency of the pasty mass, and also the filling speed. The pretension of the pressure spring 8 can be adjusted with a nut. The individual preferred parameters can be determined by trial. Thus, the piston 7 can be at least partially moved out of the flow channel 12 through the pasty mass 4 against the spring force of the pressure spring 8. The higher the filling speed (flow rate) of the pasty mass or the more viscous the product is, the more the piston 7 is moved in the direction of the pressure spring 8, as is represented by the arrow. The number of baffles 6 (that means the effective length L1) which the product 4 must pass is thereby reduced, so that a weaker throttle effect and less mixing occur. With a slower filling speed or a more liquid product, the piston moves away from the pressure spring 8, so that the length L, i.e. the effective length L of the piston and moreover also the length L1 of the section with baffles 6, are increased, so that the pasty mass 4 then has to flow again over more baffles, leading to better mixing and moreover to a higher flow resistance and throttling. A self-regulating system is formed wherein the pressure in a region in front of the distributor means 1, i.e. here in front of the piston 7, can be kept constant independent of which filling speed is adjusted or which viscosity the pasty mass 4 has. This constant filling pressure, however, is important for a successful homogenization of air inclusions and is moreover also important for the pasty mass not being damaged by excessive pressure. For this, the spring tension can be adjusted. This distributor means 1, i.e. here the piston 7 with the baffles 6, can also be completely moved out of the flow channel 12, for example if the pressure in front of the distributor means 1 is very high. This can be the case, for example, if the filling speed is high and the product has a very high viscosity, i.e. is very tough. However, it is also possible to pull the distributor means manually out of the flow channel against the spring force of the spring 8 if no throttling is desired.

Thus, the throttle effect and thus mixing can be adjusted without the distributor means 10 having to be exchanged.

Figure 4:
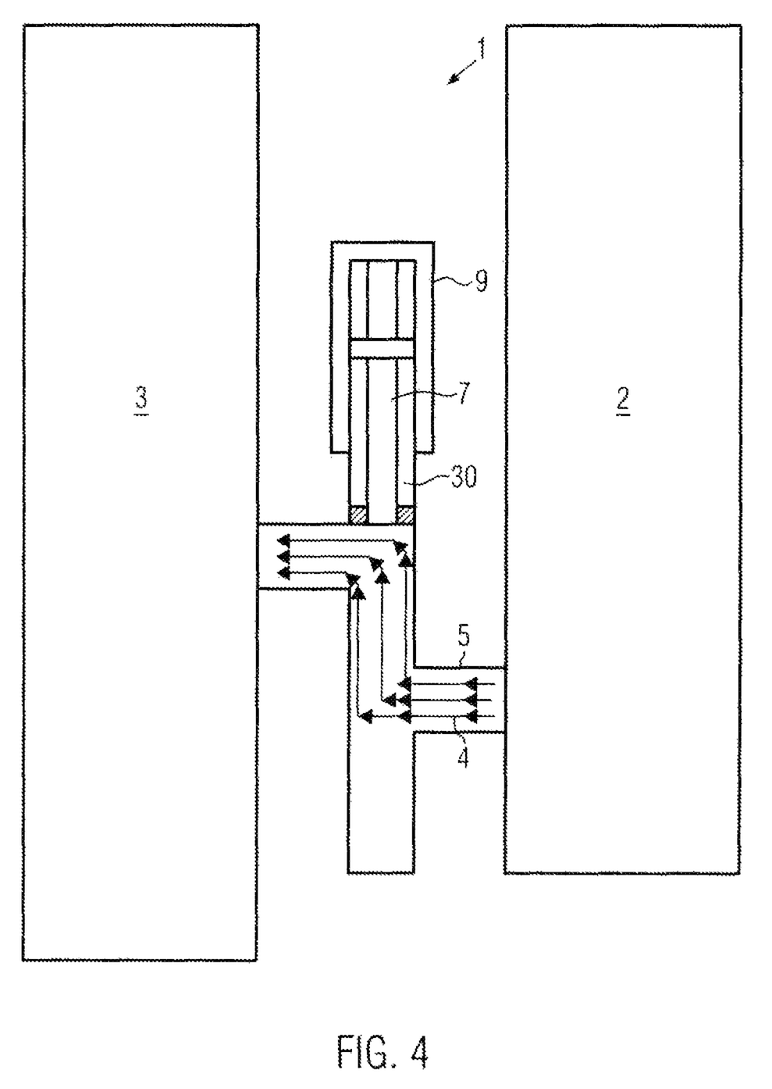
FIG. 4 shows a section through a device according to the present disclosure with a piston without baffle.

As is represented in FIG. 4, with products with coarse ingredients, e.g. ham sausage, a piston 7 can be used which does not have any additional baffles. Here, the baffle piston 7 can be replaced, for example, by the piston without baffles, as is represented in FIG. 4. This piston then serves to seal the hollow space 30 in the housing 5 which is located behind the flow channel 12 and in which the pressure spring is arranged. Here, the piston 7 can be easily replaced without the device 1 having to be dismounted.

Figure 6:
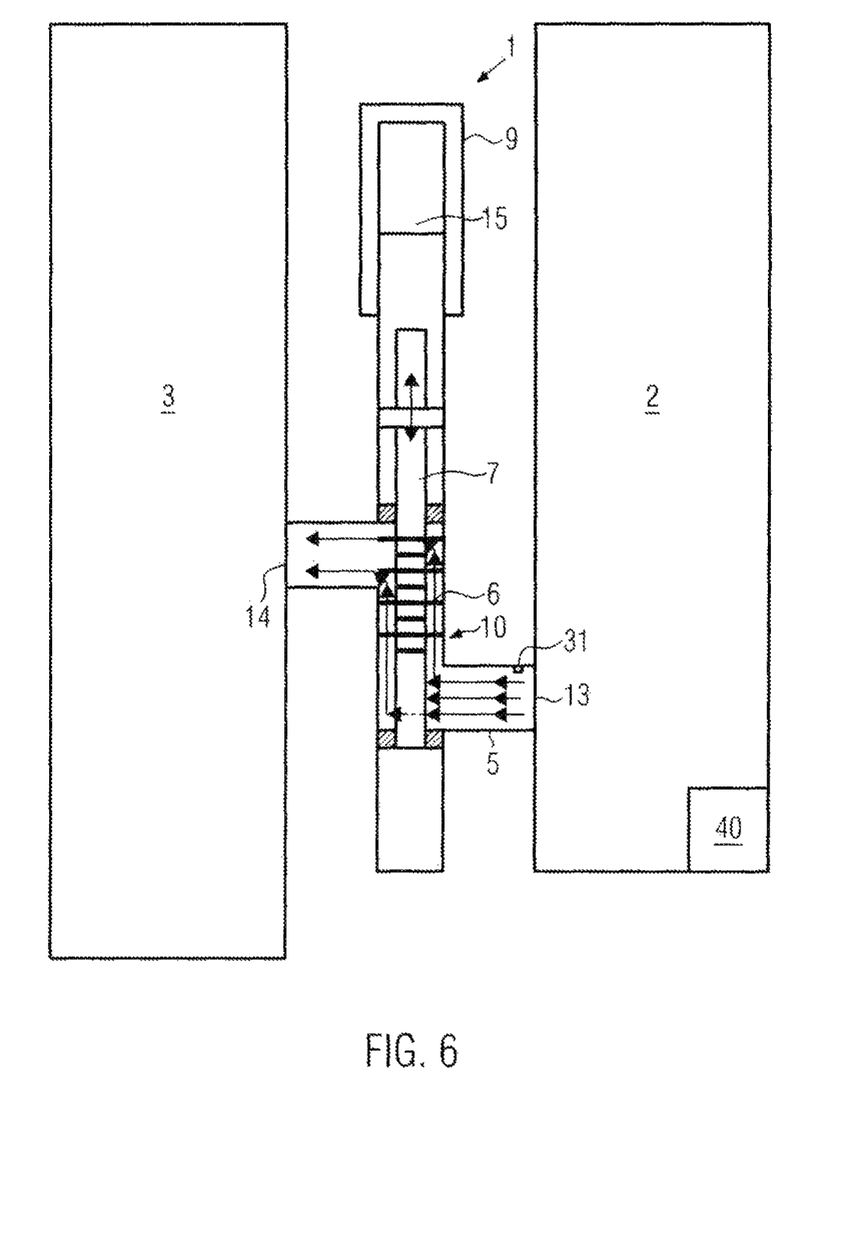
FIG. 6 shows a cross-section through a device according to the disclosure according to a further embodiment comprising a controlled drive.

FIG. 6 shows another embodiment according to the present disclosure. Here, the distributor means 10, i.e. here the piston 7 with the baffles 6, is moved via a drive, as represented by the arrows. The controlled drive can here be effected, for example, via a not represented servomotor or compressed air. In controlling, for example, the pressure of the pasty mass upstream of the distributor means 10 or downstream of the distributor means can be detected by a pressure sensor 31.

A controlling means 40 can then move the distributor means to a certain position, for example, depending on the pressure upstream of the distributor means 10, so that a certain constant pressure can be adjusted in a region upstream of the distributor means 10.

Figure 7:
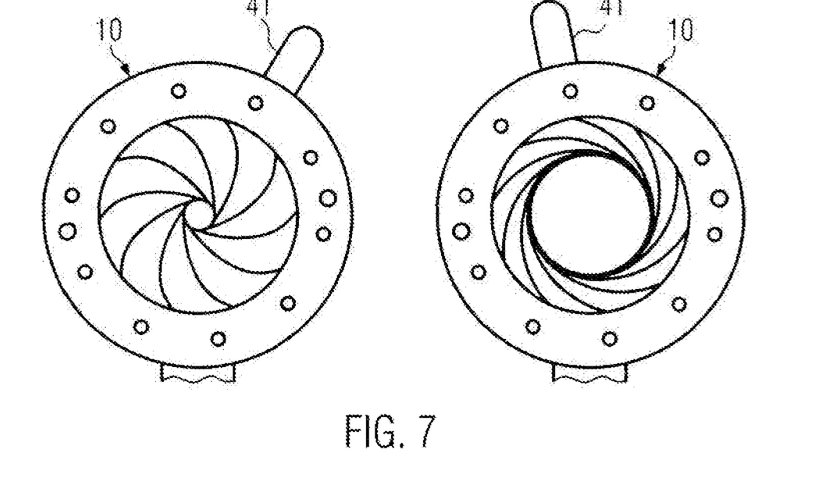
FIG. 7 shows a front view of a distributor means in the form of an iris diaphragm according to another embodiment of the present disclosure, FIG. 8 schematically shows another embodiment of a distributor means in the form of a gate valve, FIG. 9 schematically shows a section through a particular embodiment of a piston with several baffles arranged upon it.

FIG. 7 shows another possible embodiment of the present disclosure, wherein the distributor means 10 can be embodied as an iris diaphragm, wherein the free cross-section of flow in the flow channel 12 can be adjusted via the position of the installed iris diaphragm. The adjustment of the cross-section of flow can be effected here, as also described in the previous embodiments, manually or via a controlling unit 40 by a not represented drive. For manual adjustment, the lever 41 can be, for example, reciprocated for adjusting the iris diaphragm. If filling speed is high and/or the pasty mass is highly viscous, a weak throttling and thus a weak mixing is selected, the iris diaphragm then having a relatively large opening, as is represented in the right section of FIG. 7. At a slower filling speed or with a low-viscosity pasty mass, throttling is stronger and mixing is more intense due to the turbulences, the opening then having a smaller diameter (see left half of FIG. 7). This means that as the filling speed and/or viscosity increase, the opening is enlarged. Here, it is neither necessary to dismount the distributor means 10.

Figure 8:
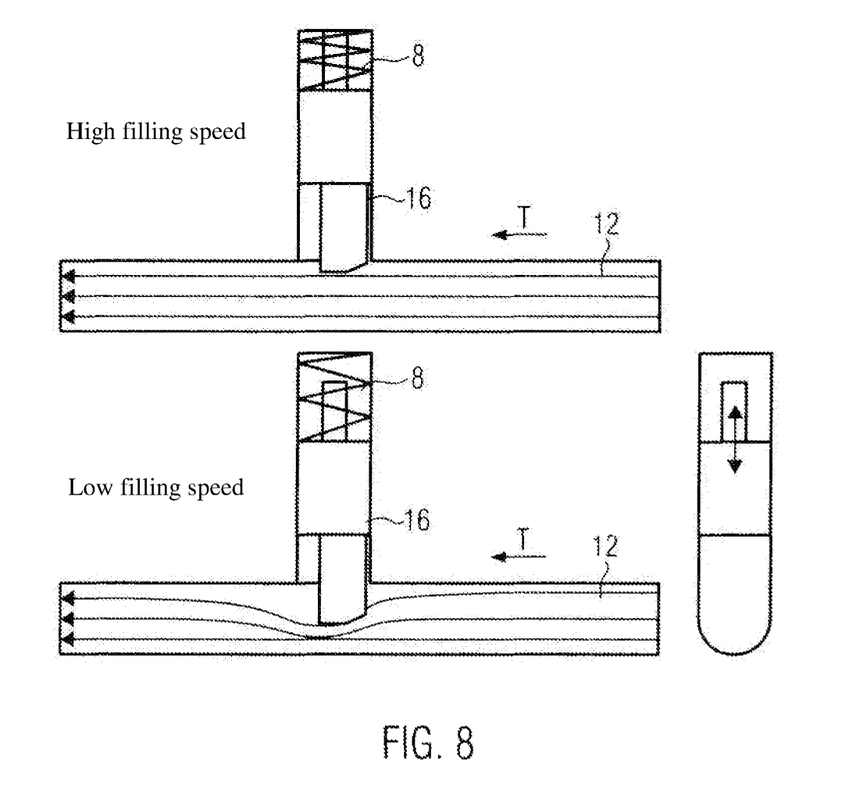

FIG. 8 shows another possible embodiment according to the present disclosure. Here, the distributor means 10 is embodied as a gate valve 16 which can be moved transversely to the direction of transport T of the pasty mass into the flow channel 12. The gate valve can be either actuated manually for reducing the cross-section or be driven via a drive (compressed air, servomotor, etc). The position of the gate valve 16 can be either actuated manually or adjusted by a controlling means 40, as described above, depending on the pressure in front of the gate valve. Self-control via a spring 8 is also possible. The pasty mass exerts a compressive force onto the valve, so that it is pressed upwards against the spring force of the spring 8, as was also described in connection with the first embodiment. The pretensioning force of the spring 8 can also be adjusted in this embodiment e.g. via a nut.

Figure 9:
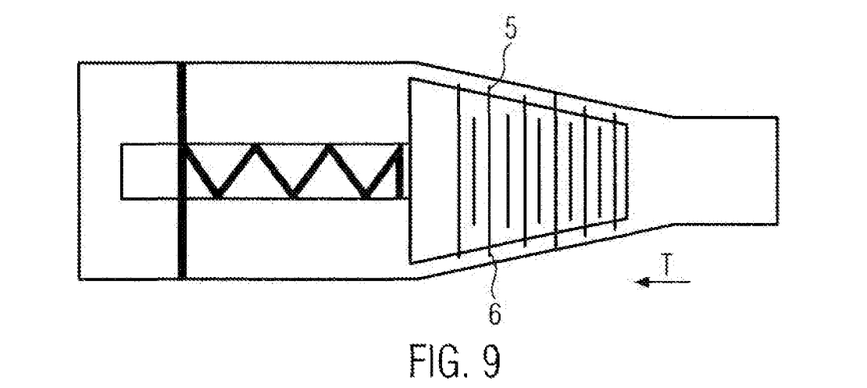

It is particularly advantageous, as is shown in FIG. 9, if the distributor means 10, i.e. here the piston 7 with the baffles 6, at least in sections comprises a cross-section tapering against the direction of flow and being at least in sections in particular conical. The housing 5 then has a correspondingly complementary shape. The baffle piston can then also serve as a shut-off valve in its home position. Moreover, the control paths are shorter.

Figure 10:
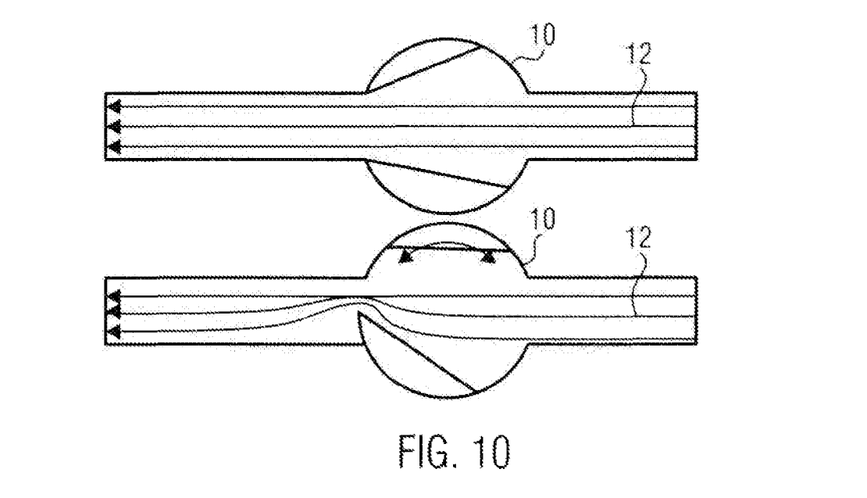
FIG. 10 shows another embodiment of a distributor means in the form of a rotary piston stop valve according to the present disclosure.

FIG. 10 shows another embodiment according to the present disclosure. Here, the distributor means is embodied as a rotary piston stop valve or according to the ball valve principle. The stop valve can here be adjusted by manual control. However, it is also possible to adjust the stop valve electrically, pneumatically or hydraulically. This can be done by open-loop or closed-loop control. With closed-loop control, the position of the distributor means 10 can be controlled, as in the previous embodiments, depending on the pressure upstream of the distributor means 10, i.e. here upstream of the rotary piston stop valve.

Depending on the position of the stop valve, the sectional area of flow is changed causing a correspondingly higher or lower pressure in the conveyor system outlet. Thus, the same advantages result as they have been described in connection with the previous embodiments.

The best results with respect to the homogenization of the pasty mass result with the embodiments shown in connection with FIGS. 2 and 3, where the effective length L, i.e. the total effective length of the distributor means in the flow channel 12, and in particular also the effective length L1 of the section with baffles 6 in the flow channel 12, can be adjusted.

Below, an operating method for the device according to the disclosure will be illustrated more in detail, in particular in connection with the embodiment shown in FIGS. 2 and 3.

Pasty mass is introduced into the inlet 13 of the housing 5 upstream of the device 1 via the not represented conveyor system of the filling machine 2 for distributing residual air. For a certain process with a certain filling speed (flow rate) and a pasty mass with a certain viscosity and/or consistency, the pressure spring 8 is adjusted to a suited pretension determined by trial. During the operation, the piston 7 is then moved through the pasty mass to a certain position, so that a certain effective length L of the piston in the flow channel 12 and also a certain effective length L1 of the section with the baffles 6 in the flow channel 12 results. Variations in the speed of the pasty mass 4 can thus also be easily compensated, so that an essentially constant pressure can be maintained upstream of the distributor means 10, i.e. here in front of the piston 7. The pasty mass 4 in this embodiment flows over the different baffles 6 or through them, so that residual air in the pasty mass can be uniformly distributed. The pasty mass with the distributed residual air can then be fed to an attachment 3 via the outlet 14. With a varying filling speed, the position of the distributor means changes, so that varying mixing or throttle effects result. With a new process with a highly changing viscosity of the pasty mass, the compressive force of the spring can also be adjusted.

Instead of the self-regulating system by means of the pressure spring 8, as described before, a controlling means 40 can also adjust the position of the distributor means via a drive, for example depending on the pressure upstream of the distributor means 10. Thus, the effective length L, i.e. the total piston length in the flow channel 12 or also the effective length L1 of the baffle section, can then be adjusted to maintain the pressure upstream of the distributor means 10 within a largely constant range. The pressure typically varies within a range of +/−30%, exceptionally also above it. In case of lumpy products, the piston can also be pulled completely out of the flow channel 12 into a space 30 of the housing behind the flow channel 12, so that no more throttling and mixing is effected.

What is claimed is:

1. A method of distributing residual air in pasty masses, comprising conducting a pasty mass (4) through a residual air distributing device (1), deflecting and mixing the pasty mass by a distributor means (10), and adjusting the mixing by adjusting the installed distributor means (10), the distributor means (10) comprises a piston (7) with several baffles (6) arranged thereon, the piston (7) movable at least in a portion of the flow channel (12) opposite to and with the direction of flow, so that the effective length of the piston (7) in the flow channel (12) can be adjusted.

2. The method according to claim 1, wherein the position of the installed distributor means (10) can be changed, whereby one of a free cross-section of flow in the flow channel (12) is adjusted at least in sections, the effective length (L; L1) of the section with a reduced cross-section of flow is adjusted, and a combination thereof.

3. The method according to claim 1, further comprising one of adjusting and controlling the position of the installed distributor means (10) depending on one of the pressure of the pasty mass upstream of the distributor means, seen in the direction of flow, the filling speed, the viscosity, the consistency of the pasty mass, and a combination thereof, and controlling the position of the installed distributor means such that the pressure is kept essentially constant.

4. The method according to claim 1, further comprising conducting the pasty mass from a conveyor system of a filling machine (2) into the residual air distributing device (1), wherein the residual air in the pasty mass is uniformly distributed, the pasty mass is subsequently fed to an attachment (3), and ejected via a filling tube.

5. The method according to claim 1, wherein in conducting the pasty mass, the pasty mass comprises meat for the production of sausages.

* * * * *